(12) United States Patent
Ibukuro

(10) Patent No.: US 6,674,927 B2
(45) Date of Patent: Jan. 6, 2004

(54) OPTICAL MODULATOR WITH REDUCED DETERIORATION OF OPTICAL WAVEFORM IN HIGH FREQUENCY BAND

(75) Inventor: Sadao Ibukuro, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 119 days.

(21) Appl. No.: 09/942,738

(22) Filed: Aug. 31, 2001

(65) Prior Publication Data

US 2002/0181823 A1 Dec. 5, 2002

(30) Foreign Application Priority Data

Mar. 28, 2001 (JP) ......................................... 2001-092204

(51) Int. Cl.[7] ............................................. G02F 1/035
(52) U.S. Cl. ................... 385/3; 385/1; 385/2; 359/238; 359/245; 359/254
(58) Field of Search ......................... 385/1–3; 359/238, 359/245, 254

(56) References Cited

U.S. PATENT DOCUMENTS

| | | | | |
|---|---|---|---|---|
| 5,621,560 A | * | 4/1997 | Wood ........................ 359/161 |
| 5,793,516 A | * | 8/1998 | Mayer et al. ................ 359/245 |
| 5,805,321 A | * | 9/1998 | Ooi et al. .................... 359/124 |
| 5,805,744 A | * | 9/1998 | Nakano et al. ........ 369/110.02 |
| 5,880,870 A | * | 3/1999 | Sieben et al. ................ 359/181 |
| 5,991,316 A | * | 11/1999 | Kikuchi ....................... 359/326 |
| 6,148,122 A | * | 11/2000 | Cao et al. ....................... 385/1 |
| 6,243,505 B1 | * | 6/2001 | Bosso et al. ................... 385/2 |
| 6,278,539 B1 | * | 8/2001 | Ooi et al. .................... 359/237 |
| 6,337,756 B1 | * | 1/2002 | Djupsjobacka .............. 359/180 |
| 6,341,184 B1 | * | 1/2002 | Ho et al. ......................... 385/1 |
| 6,483,953 B1 | * | 11/2002 | McBrien et al. ............... 385/2 |
| 6,580,840 B1 | * | 6/2003 | McBrien et al. ............... 385/2 |
| 6,606,424 B2 | * | 8/2003 | Ooi et al. ....................... 385/3 |

FOREIGN PATENT DOCUMENTS

JP     2000-249994     9/2000

\* cited by examiner

Primary Examiner—Brian Healy
Assistant Examiner—Daniel Petkovsek
(74) Attorney, Agent, or Firm—Staas & Halsey LLP

(57) ABSTRACT

In an optical modulator having an electric waveguide and an optical waveguide, a filter converts a modulating signal into a signal equalizing a frequency characteristic of an acting amount to be provided to the electric waveguide. Also, the filter approximates the frequency characteristic of the acting amount caused by a skin effect in the electric waveguide.

10 Claims, 10 Drawing Sheets

| FREQUENCY | ATTENU-ATED AMOUNT | ACTING AMOUNT |
|---|---|---|
| 0.01 | -0.160 | -0.0816 |
| 0.02 | -0.227 | -0.1147 |
| 0.03 | -0.278 | -0.1401 |
| 0.04 | -0.321 | -0.1615 |
| 0.05 | -0.359 | -0.1803 |
| 0.06 | -0.393 | -0.1973 |
| 0.07 | -0.424 | -0.2129 |
| 0.08 | -0.454 | -0.2274 |
| 0.09 | -0.481 | -0.2411 |
| 0.10 | -0.507 | -0.2539 |
| 0.20 | -0.717 | -0.3578 |
| 0.30 | -0.879 | -0.4371 |
| 0.40 | -1.014 | -0.5039 |
| 0.50 | -1.134 | -0.5625 |
| 0.60 | -1.242 | -0.6154 |
| 0.70 | -1.342 | -0.6639 |
| 0.80 | -1.435 | -0.7090 |
| 0.90 | -1.522 | -0.7513 |

| FREQUENCY | ATTENU-ATED AMOUNT | ACTING AMOUNT |
|---|---|---|
| 1.00 | -1.604 | -0.7912 |
| 2.00 | -2.268 | -1.1111 |
| 3.00 | -2.778 | -1.3537 |
| 4.00 | -3.208 | -1.5563 |
| 5.00 | -3.587 | -1.7333 |
| 6.00 | -3.929 | -1.8921 |
| 7.00 | -4.244 | -2.0372 |
| 8.00 | -4.537 | -2.1715 |
| 9.00 | -4.812 | -2.2968 |
| 10.00 | -5.072 | -2.4146 |
| 11.00 | -5.320 | -2.5262 |
| 12.00 | -5.556 | -2.6322 |
| 13.00 | -5.783 | -2.7334 |
| 14.00 | -6.002 | -2.8303 |
| 15.00 | -6.212 | -2.9234 |
| 16.00 | -6.416 | -3.0130 |
| 17.00 | -6.613 | -3.0995 |
| 18.00 | -6.805 | -3.1831 |
| 19.00 | -6.992 | -3.2642 |
| 20.00 | -7.173 | -3.3428 |

| FREQUENCY | ATTENUATED AMOUNT | ACTING AMOUNT |
|---|---|---|
| 0.01 | -0.234 | -0.1147 |
| 0.02 | -0.331 | -0.1614 |
| 0.03 | -0.405 | -0.1972 |
| 0.04 | -0.468 | -0.2274 |
| 0.05 | -0.523 | -0.2539 |
| 0.06 | -0.573 | -0.2779 |
| 0.07 | -0.619 | -0.2999 |
| 0.08 | -0.662 | -0.3203 |
| 0.09 | -0.702 | -0.3395 |
| 0.10 | -0.740 | -0.3577 |
| 0.20 | -1.040 | -0.5038 |
| 0.30 | -1.282 | -0.6153 |
| 0.40 | -1.480 | -0.7089 |
| 0.50 | -1.665 | -0.7911 |
| 0.60 | -1.813 | -0.8652 |
| 0.70 | -1.958 | -0.9331 |
| 0.80 | -2.083 | -0.9961 |
| 0.90 | -2.220 | -1.0552 |

| FREQUENCY | ATTENUATED AMOUNT | ACTING AMOUNT |
|---|---|---|
| 1.00 | -2.340 | -1.1109 |
| 2.00 | -3.309 | -1.5560 |
| 3.00 | -4.053 | -1.8918 |
| 4.00 | -4.680 | -2.1711 |
| 5.00 | -5.232 | -2.4142 |
| 6.00 | -5.732 | -2.6317 |
| 7.00 | -6.191 | -2.8298 |
| 8.00 | -6.619 | -3.0125 |
| 9.00 | -7.020 | -3.1826 |
| 10.00 | -7.400 | -3.3422 |
| 11.00 | -7.761 | -3.4929 |
| 12.00 | -8.106 | -3.6357 |
| 13.00 | -8.437 | -3.7718 |
| 14.00 | -8.755 | -3.9019 |
| 15.00 | -9.063 | -4.0265 |

FIG.8A  FIXED RESISTANCE FILTER (TYPE 1)
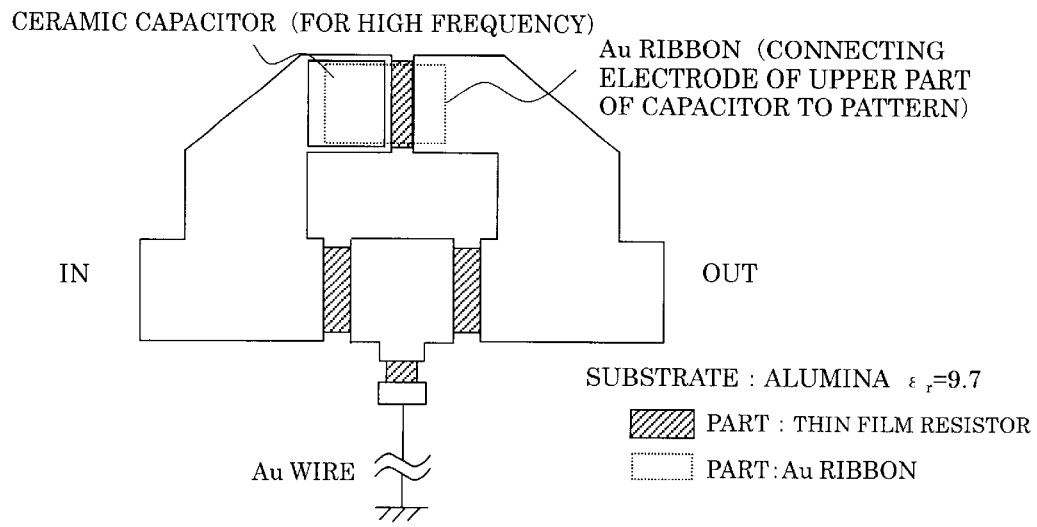
FIG.8B  FIXED RESISTANCE FILTER (TYPE 2)
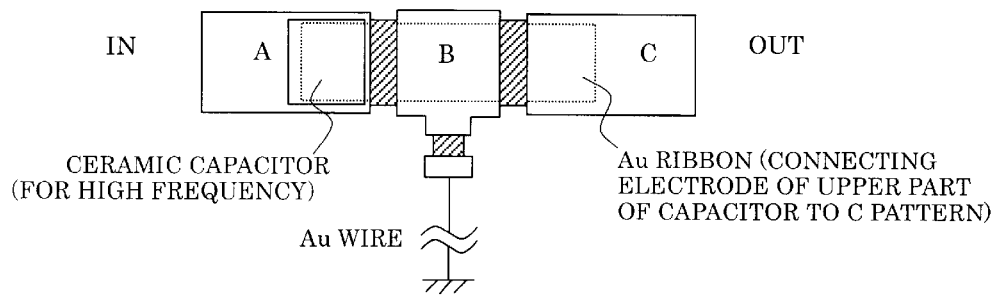
FIG.8C  FIXED RESISTANCE FILTER (TYPE 3)
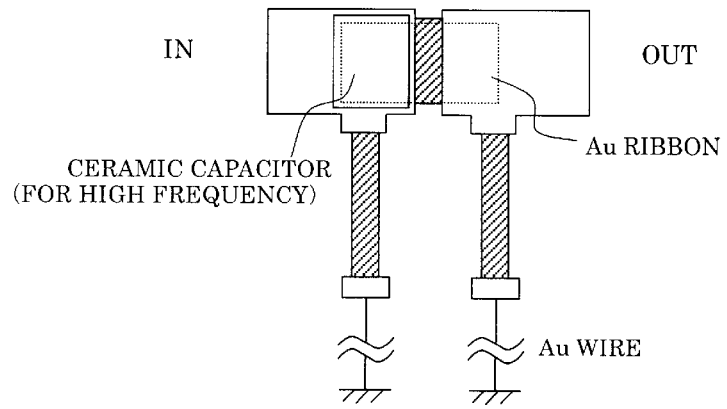

US 6,674,927 B2

OPTICAL MODULATOR WITH REDUCED DETERIORATION OF OPTICAL WAVEFORM IN HIGH FREQUENCY BAND

BACKGROUND OF THE INVENTION

1. Field of the Invention

The present invention relates to an optical modulator, and in particular to an optical modulator having an electric waveguide and an optical waveguide.

Recent optical communication technology has been remarkably developed, leading a trunk information communication network to a high-speed optical communication, so that optical fibers are going to be brought into households. With this development, it has become more and more important to enhance the speed of an optical modulator which puts information on a lightwave, presenting one of the basic communication technologies for transmitting a large amount of information at a high speed.

2. Description of the Related Art

As a prior art optical modulator, a Mach-Zehnder type optical modulator of LiNbO$_3$ (Lithium Niobate, hereinafter abbreviated as LN), for example, is an optical intensity modulator having a good transmission characteristic, by the combination of an LN optical phase modulator and a Mach-Zehnder type interferometer. It is used for many transmitters of a high optical transmission speed such as 2.4 GHz, 10 GHz, and 40 GHz.

FIG. 12 shows an arrangement of an optical phase modulator 100', which is composed of an electric waveguide 20 (generally referred to as electrode) and an optical waveguide 10. A modulating signal 71 from a modulating signal generator 40 is inputted to the electric waveguide 20 as a modulating signal 71a through a driver 50.

The electric waveguide 20 converts the inputted modulating signal 71a into an acting amount (modulating amount) 80 to be provided to the optical waveguide 10. The acting amount 80 is for providing a modulation to a lightwave 81 which propagates through the optical waveguide 10.

In case of an optical phase modulation made by an electro-optical effect for example, the acting amount 80 is proportional to the product of a modulation voltage V (electric field E) and its acting interval L.

Since there is a resistance caused by a skin effect in the metal of the electric waveguide 20 in a modulator such as a traveling wave type optical phase modulator, a frequency characteristic of $f^{1/2}$ arises as the frequency of the modulating signal increases, thereby narrowing a bandwidth (see characteristic curve A in FIG. 5A). Accordingly, the acting amount 80 of the travelling wave type optical phase modulator has an attenuation in a high frequency area caused by the skin effect (see characteristic curve B in FIG. 5A).

Also, the acting amount 80 of a concentrated constant type optical phase modulator has an attenuation in the high frequency area. This attenuation is determined by an impedance-matching resistance R (not shown) between the electric waveguide (electrode) 20 and the driver 50, and by the frequency characteristic determined by a capacitance C (not shown) and stray capacitances of the electric waveguide 20. It is to be noted that this frequency characteristic is not shown.

In either optical modulator, an intersymbol interference increases as the attenuation increases, so that an optical waveform deteriorates.

SUMMARY OF THE INVENTION

It is accordingly an object of the present invention to provide an optical modulator having an electric waveguide and an optical waveguide which suppresses an attenuation in a high frequency band of an acting amount inputted to the optical waveguide.

In order to achieve the above-mentioned object, an optical modulator according to the present invention comprises: an optical waveguide for propagating a lightwave, an electric waveguide for providing an acting amount, to the optical waveguide, for modulating the lightwave by a modulating signal, and a filter for converting the modulating signal into a signal approximating a frequency characteristic of the acting amount to be provided to the electric waveguide.

FIG. 1 shows a principle (1) of an optical modulator 100 according to the present invention. A modulating signal 71 outputted from a modulating signal generator 40 serves to modulate a lightwave 81. An electric waveguide 20 provides, to an optical waveguide 10, an acting amount 80 obtained by converting a modulating signal 72 based on a control method of an optical modulator, e.g. a control method of an electro-optical effect or the like.

The acting amount 80 has a frequency characteristic caused, for example, by stray capacitances of the electric waveguide 20 itself in a concentrated constant type optical phase modulator, and by a skin effect of the electric waveguide 20 itself in a traveling wave type optical phase modulator as will be described later.

Accordingly, when the modulating signal 72 same as the modulating signal 71 is inputted to the electric waveguide 20, the lightwave 81 which propagates through the optical waveguide 10 becomes a lightwave 82 modulated by the acting amount 80 having the frequency characteristic.

In the present invention, a filter 30 converts the modulating signal 71 into the modulating signal 72 for equalizing the frequency characteristic (not a frequency characteristic of electric waveguide itself of the acting amount 80 to be inputted to the electric waveguide 20. Thus, the frequency characteristic of the acting amount 80 is approximated to be almost flat in all of the areas from the low frequency area to the high frequency area, enabling the optical modulator 100 to perform an optical modulation independent of the frequency of the modulating signal 71.

It is to be noted that since FIG. 1 is a schematic diagram, the driver 50 shown in FIG. 12 is omitted.

Also, in the present invention according to the above-mentioned invention, the frequency characteristic of the acting amount may comprise a characteristic caused by a skin effect in the electric waveguide.

Namely, as mentioned above, the resistance of the electric waveguide 20 has the frequency characteristic of $f^{1/2}$ by the skin effect. Accordingly, the acting amount 80 has the frequency characteristic caused by the frequency characteristic of the resistance. The filter 30 approximates this frequency characteristic of the acting amount 80.

FIGS. 2A and 2B show a principle of approximating the frequency characteristic of the acting amount 80 caused by e.g. the skin effect. FIG. 2B shows a model of the electric waveguide 20, in which a modulating source 40, its internal resistor 42, the electric waveguide 20 having a skin effect resistance, and a terminal resistor 44 are connected in cascade. The values of the resistors 42, 44, and of an impedance Z of the electric waveguide 20 are $R_0$.

FIG. 2A shows a distribution of a voltage v of the electric waveguide 20. The position of an acting interval where the electric waveguide 20 provides the acting amount 80 to the optical waveguide 10 is indicated by a length (distance) x normalized by a length L of the acting interval. Accordingly, x=0 at an input end of the electric waveguide 20, and x=1 at the terminating end. Since the voltage v is a function of the distance x and a frequency f of the modulating signal, it is expressed by the following equation (1):

$$v=v(f, x) \quad \text{Eq.(1)}$$

Accordingly, in the presence of the skin effect, a transfer function ($S_{21}$ parameter) indicating the relationship between the voltage v(f, 0) of the input end and the voltage v(f, 1) of the terminating end is expressed by the following equation (2):

$$20\log_{10}\frac{v(f,1)}{v(f,0)} = -\alpha\sqrt{f} \quad \text{Eq. (2)}$$

where $\alpha$ is a constant.

If the voltage v(f, x) is normalized by v(f, 0)=1, Eq.(2) assumes the following equation (3), and accordingly, an output voltage v(f, 1) is expressed by the following equation (4):

$$20\log_{10} v(f,1) = -\alpha\sqrt{f} \quad \text{Eq.(3)}$$

$$v(f,1) = 10^{-\frac{\alpha\sqrt{f}}{20}} \quad \text{Eq. (4)}$$

The frequency characteristic of Eq.(4) corresponds to the attenuated amount curve A in FIG. 5A as will be described later.

Since being distributed in the electric waveguide 20 is attenuated exponentially with a function for the distance x from the input end, the voltage v(f, x) is expressed by the following equation (5):

$$v(f, x) = e^{-\beta(f)x} \quad \text{Eq.(5)}$$

where $\beta$ is a coefficient depending on the frequency f.

Since the voltage v(f, 1) of the terminating end obtained by substituting x=1 into Eq.(5) coincides with Eq.(4), the following equation (6) is given.

$$e^{-\beta(f)} = 10^{-\frac{\alpha\sqrt{f}}{20}} \quad \text{Eq. (6)}$$

Accordingly, $\beta(f)$ can be expressed by the following equation (7):

$$-\beta(f) = \log_e 10^{-\frac{\alpha\sqrt{f}}{20}} = -\frac{\alpha\sqrt{f}}{20}\cdot\log_e 10 \quad \text{Eq. (7)}$$

$$\beta(f) = \frac{\alpha\sqrt{f}}{20}\log_e 10$$

If Eq.(7) is substituted into Eq.(5), the voltage v(f, x) can be expressed by the following equation (8):

$$v(f,x) = e^{-\left(\frac{\alpha\sqrt{f}}{20}\log_e 10\right)x} \quad \text{Eq. (8)}$$

The curve of Eq.(8) is shown in FIG. 2A.

It is supposed that the acting amount 80 which performs a phase modulation to the lightwave 81 (see FIG. 1) is a function q(f) of a modulating frequency f. Also, supposing that the phase modulation is performed by the electro-optical effect, the acting amount q(f) assumes the product of the voltage v and the distance x microscopically. Accordingly, the following equation (9) is given.

$$q(f) = \int_0^1 v(f,x)dx \quad \text{Eq. (9)}$$

By substituting Eq.(8) into Eq.(9) to obtain the integral value, the acting amount q(f) can be expressed by the following equation (10):

$$q(f) = \frac{20}{\alpha\sqrt{f}\cdot\log_e 10}\left(1 - 10^{-\frac{\alpha\sqrt{f}}{20}}\right) \quad \text{Eq. (10)}$$

Namely, the filter 30 may inversely compensate (equalize) the frequency characteristic of the acting amount q(f) in Eq.(10).

Also in the present invention according to the above-mentioned invention, the electric waveguide may perform an optical phase modulation of the lightwave by an electro-optical effect.

Also in the present invention according to the above-mentioned invention, an interval length in which the electro-optical effect between the electric waveguide and the optical waveguide acts, and a voltage value provided to the electric waveguide may be mutually determined.

As mentioned above, the frequency characteristic occurs by the resistance caused by the skin effect of the electric waveguide 20, which narrows the bandwidth. As measures against it, the prior art optical modulator 100 had the length L of the electric waveguide 20 shortened, and the influence of the skin effect lessened to secure the band.

However, in case the length of the electric waveguide 20 is shortened, a required voltage V$\pi$ (usually referred to as half-wave voltage) becomes high, since the phase modulation of the lightwave 81 passing through the optical waveguide 10 is proportional to voltage V×waveguide length L.

For this reason, as the frequency of the modulating signal increases, the driver 50 (see FIG. 12) which drives the optical modulator 100 is required to have a performance of a high output voltage and a wide band, which leads to a great difficulty in manufacturing.

FIG. 3 shows a relationship between the distance x and the voltage v(f, x) in the electric waveguide 20 shown in FIG. 2A. As mentioned above, the acting amount q(f) provided to the optical waveguide 10 by the electric waveguide 20 is represented by the integral of the acting voltage v in the acting interval (0, 1).

In the optical modulator of the present invention, the frequency characteristic of the acting amount q(f) caused by the skin effect is approximated by the filter. Accordingly, as shown in FIG. 3, the modulating signal 72 added to the electric waveguide 20 is set to a low voltage $v_1$ ($v_1$<1), and an acting interval (0, $x_1$) satisfying the acting amount $q_1(v_1)$=q(f) can be determined. A normalized $x_1$ at this time becomes longer than the length "1".

Thus, lowering the voltage v which drives the electric waveguide 20 facilitates the design of the driver 50 in the electric waveguide 20.

It is to be noted that in the presence of a limitation of $x_2$<1, as the contrary example, in the acting interval length $x_2$ of the electro-optical effect, the voltage $v_2$ satisfying the acting amount $q_2(f)$=q(f) can be also determined, based on the electro-optical effect acting interval length (0, $x_2$) as shown in FIG. 3. In this case, the normalized voltage $v_2$ becomes higher than the voltage "1".

Also in the present invention according to the above-mentioned invention, the filter may be composed of a plurality of fixed resistance filters connected in a multistage cascade.

Namely, the filter can be composed by directly connecting a plurality of fixed resistance filters where the impedances are matched. Furthermore, it is also possible that the filter composed of the fixed resistance filters is directly connected to the electric waveguide for the impedance matching.

Also in the present invention according to the above-mentioned invention, the filter may be composed of filters connected in a multistage cascade through an amplifier.

Namely, as shown in FIG. 4, filters 32_1–32_3 can be connected in a multistage cascade through amplifiers 31_1 and 31_2 to compose the filter 30. It is to be noted that an amplifier 31_3 is a driver for driving the electric waveguide 20.

Furthermore, in the present invention according to the above-mentioned invention, one or two optical modulators may compose a Mach-Zehnder type optical modulator.

Namely, it is possible to combine the optical modulator 100 of the present invention with a Mach-Zehnder type interferometer to compose a Mach-Zehnder type optical modulator. The Mach-Zehnder type optical modulator 100 may be arranged in one of two optical waveguides or both of the optical waveguides in the Mach-Zehnder type interferometer.

BRIEF DESCRIPTION OF THE DRAWINGS

FIGS. 8A–8C are diagrams showing arrangements of filters (type 1–3) in an optical modulator according to the present invention;

Throughout the figures, like reference numerals indicate like or corresponding components.

DESCRIPTION OF THE EMBODIMENTS

Figure 1:
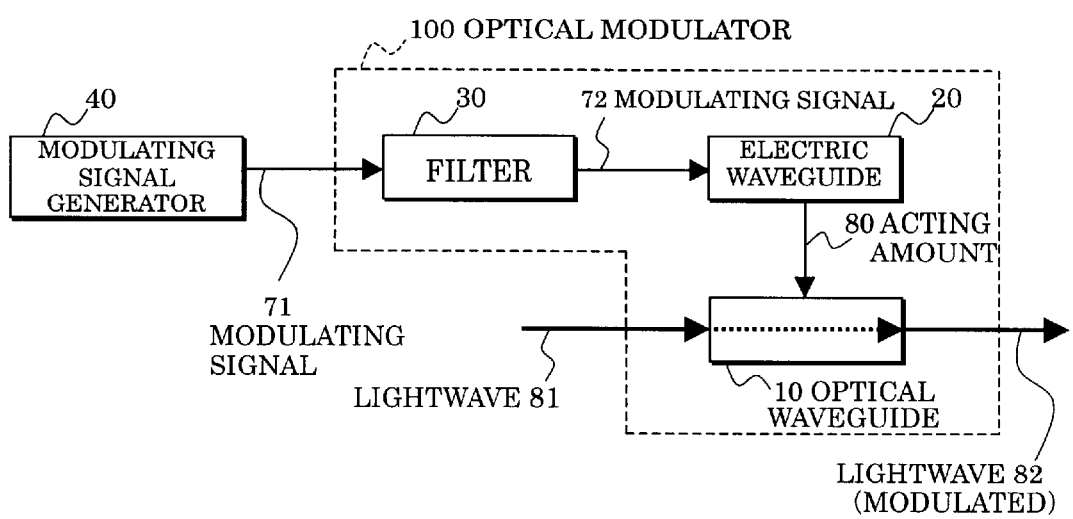
FIG. 1 is a block diagram showing a principle (1) of an optical modulator according to the present invention.
Figure 2A:
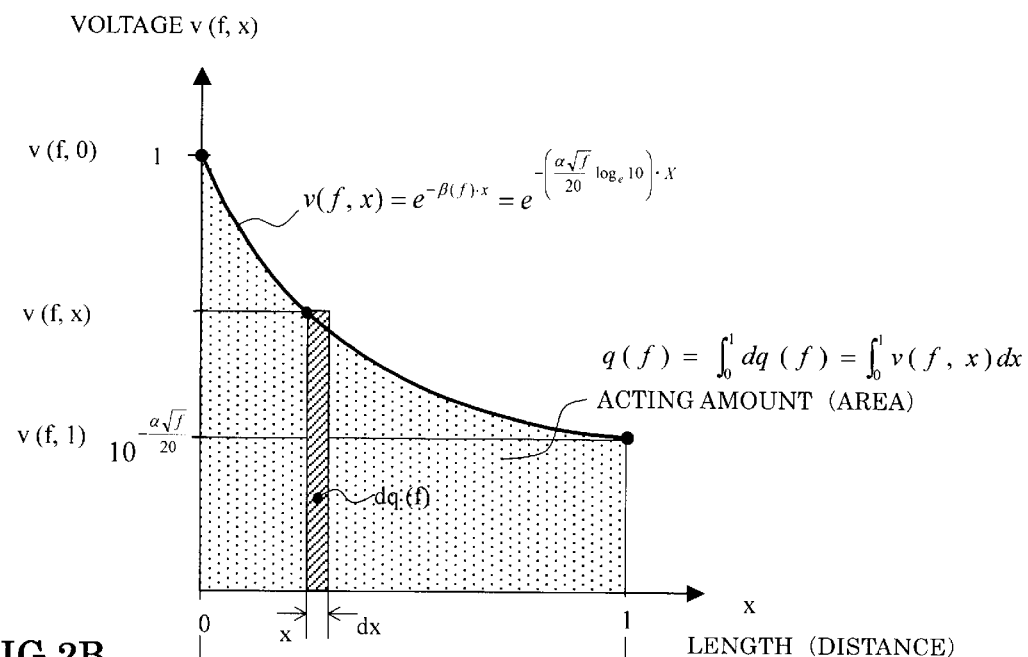
FIGS. 2A and 2B are respectively a graph and a block diagram showing a principle (2) of an optical modulator according to the present invention.
Figure 2B:
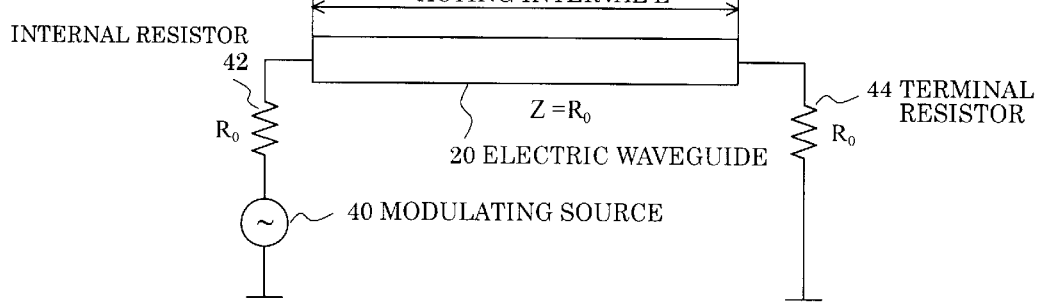
Figure 3:
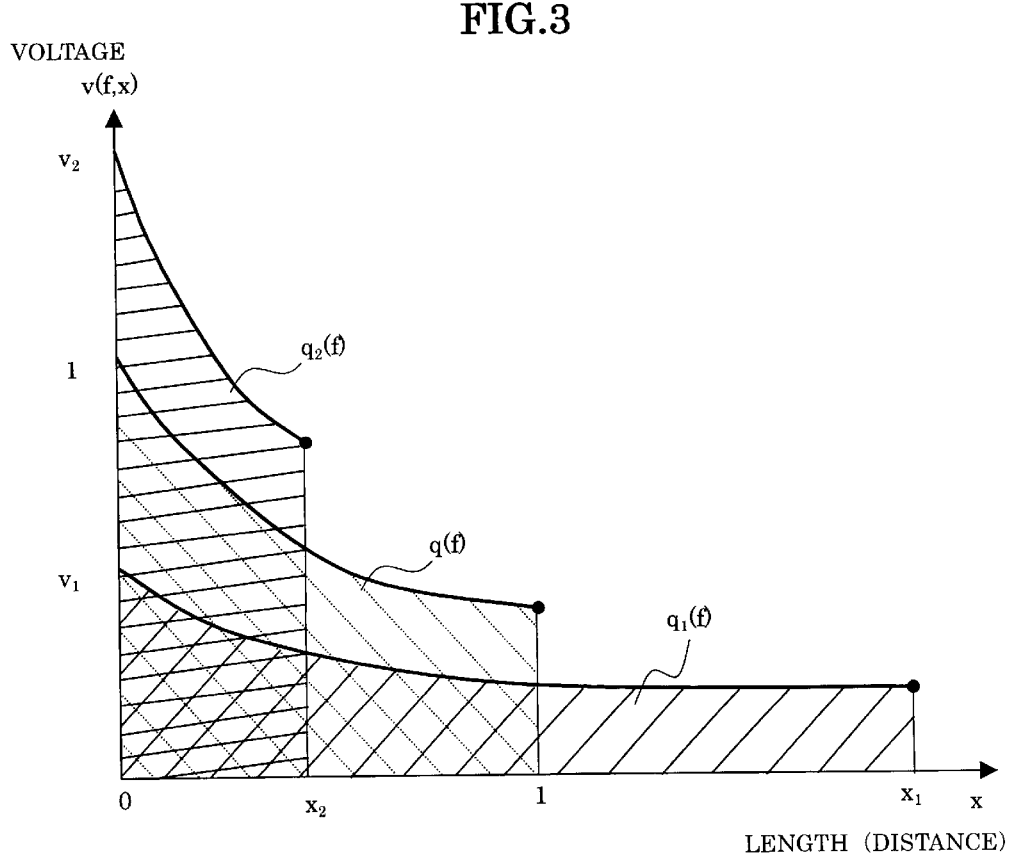
FIG. 3 is a graph showing a principle (3) of an optical modulator according to the present invention.

An embodiment (1) of an optical modulator according to the present invention will now be described based on an attenuated amount and an acting amount shown in FIGS. 5A and 5B. The arrangement of the optical modulator 100 is the same as that of the optical modulator 100 shown in FIG. 1. The optical modulator 100 is an LN optical modulator 100 for use in 12 GHz. The frequency characteristic of $S_{21}$ parameter in the electric waveguide 20 is shown as the attenuated amount (broken line A) in FIG. 5A.

This attenuated amount is one of the electric waveguide 20 caused by a skin effect. The relationship between the frequency (GHz) and the attenuated amount is shown by numerical values in the table of FIG. 5B. This relationship follows the above-mentioned Eq.(4).

Hereinafter, the frequency characteristic of the acting amount will be obtained from that of the attenuated amount.

Figures 5A, 5B:
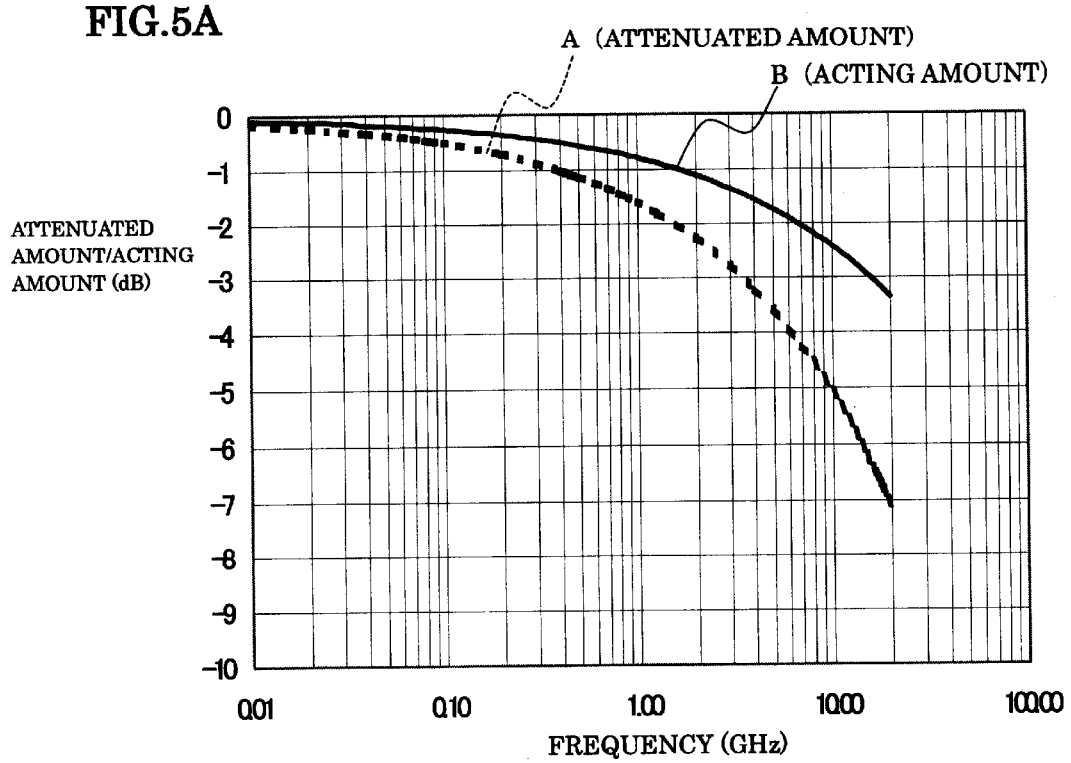
FIGS. 5A and 5B are respectively a graph and a table showing frequency characteristics of an attenuated amount and an acting amount in an embodiment (1) of an optical modulator according to the present invention.

In FIGS. 5A or 5B, the frequency in which an attenuated amount A to be used usually assumes −6 dB is 14 GHz. If this numerical value is substituted into Eq.(2), the following equation (11) is given, enabling α to be obtained.

$$\begin{aligned}-\alpha\sqrt{14} &= -6 \\ \alpha &= 1.604\end{aligned} \right\} \qquad \text{Eq. (11)}$$

By substituting the value α into Eq.(10), a frequency characteristic of an acting amount q(f) is obtained. The calculation result is shown in FIG. 5B. The graph is shown by the acting amount (solid line B) in FIG. 5A. This acting amount serves to modulate the lightwave of the optical waveguide 10 from the electric waveguide 20. In order to approximate the frequency characteristics of the acting amount q(f), the filter 30 (see FIG. 1) equalizing the frequency characteristic of the acting amount q(f) in FIG. 5A may be used.

An embodiment (2) of the optical modulator according to the present invention will now be described based on the attenuated amount and the acting amount shown in FIGS. 6A and 6B. A graph (broken line A) indicating an expected frequency characteristic of the attenuated amount and the numerical values in case where an acting interval is elongated so as to lower the driving voltage of the electric waveguide 20 are respectively shown in FIGS. 6A and 6B. It is seen from FIGS. 6A or 6B that the frequency in which the attenuated amount assumes −6 dB is 7 GHz.

In the same way as the embodiment (1), a can be obtained from the following equation (12):

$$\begin{aligned}-\alpha\sqrt{7} &= -6 \\ \alpha &= 2.268\end{aligned} \right\} \qquad \text{Eq. (12)}$$

Figures 6A, 6B:
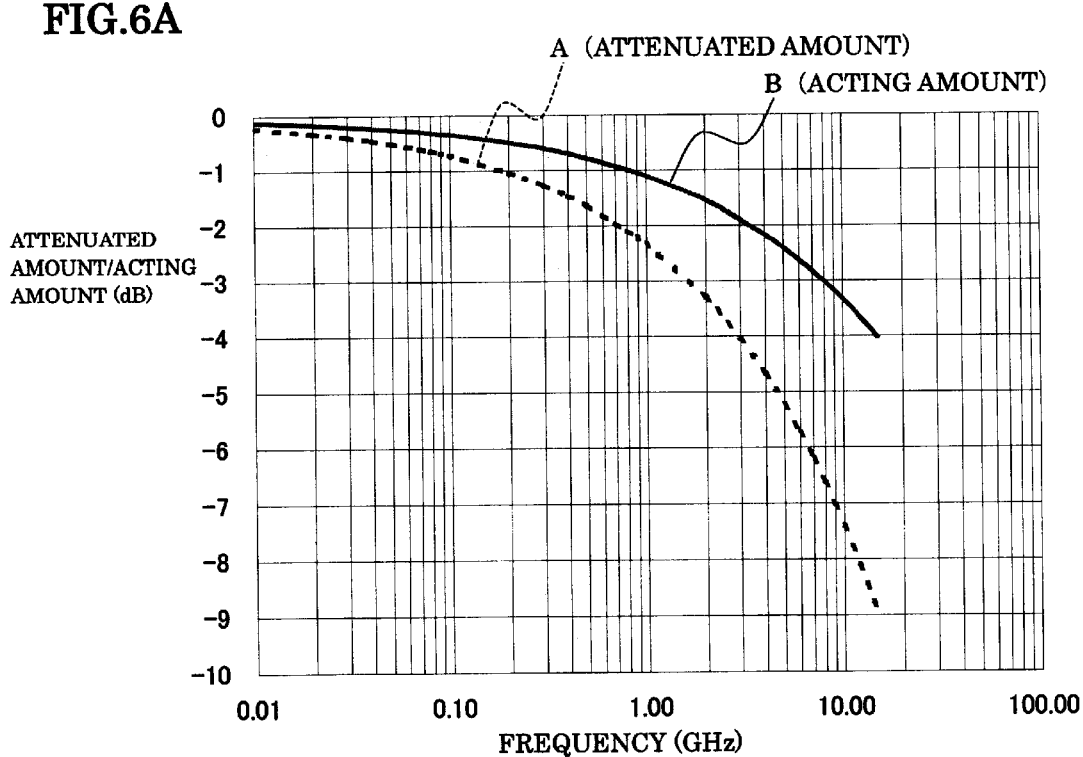
FIGS. 6A and 6B are respectively a graph and a table showing frequency characteristics of an attenuated amount and an acting amount in an embodiment (2) of an optical modulator according to the present invention.

In the same way as the embodiment (1), the calculation result of the frequency characteristic of the acting amount q(f) is shown in the column of the acting amount in FIG. 6B. Its graph is shown by the acting amount q(f) (solid line B) in FIG. 6A.

Hereinafter, a filter for equalizing the acting amount q(f) will be described.

Figure 7A:
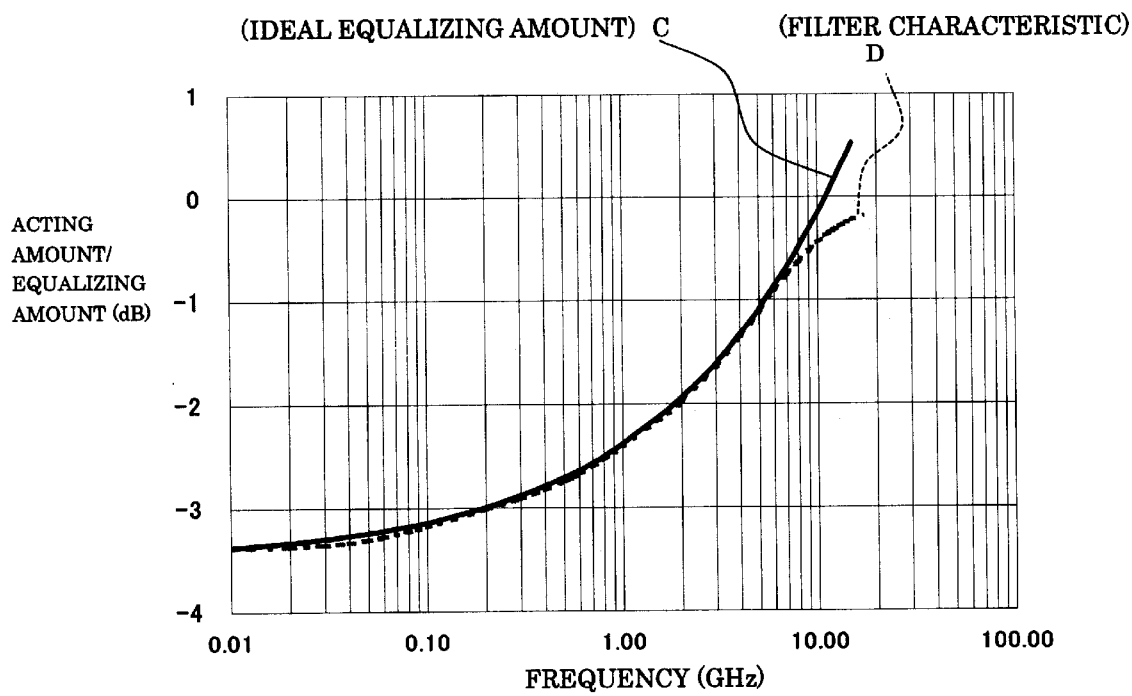
FIGS. 7A–7C are diagrams showing a filter example and its frequency characteristic in the embodiment (2) of an optical modulator according to the present invention.

A solid line C in FIG. 7A shows a frequency characteristic of an ideal equalizing amount for the filter 30 (see FIG. 1) required for equalizing the frequency characteristic of the acting amount q(f).

Figure 7B:
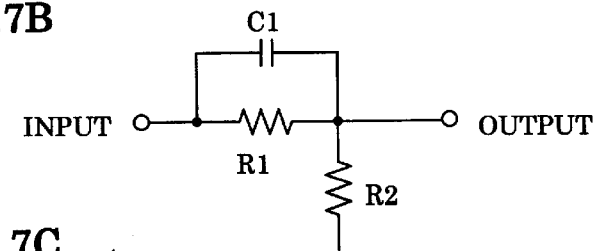
Figure 7C:
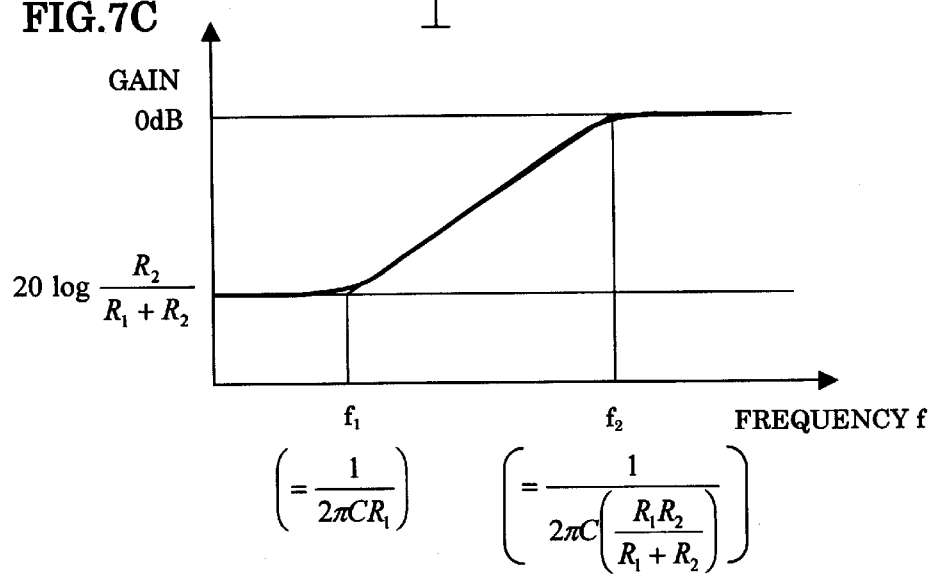

FIG. 7B shows a basic filter composed of resistors R1, and R2, and a capacitance C1. The frequency characteristic of this filter is shown in FIG. 7C. The filter 30 is composed of the basic filters being connected in a three-stage cascade.

If the frequencies (f1, f2) (see FIG. 7C) of the basic filters are respectively (0.1 GHz, 0.105 GHz), (0.8 GHz, 0.88 GHz), and (4.5 GHz, 5.76 GHz), the frequency characteristic of the filters is shown by the filter characteristic (broken line D) of FIG. 7A.

It is found that the frequency characteristic is considerably approximated to the ideal equalizing amount (solid line C), and the filter 30 can be composed of the three-stage basic filter.

Figure 4:
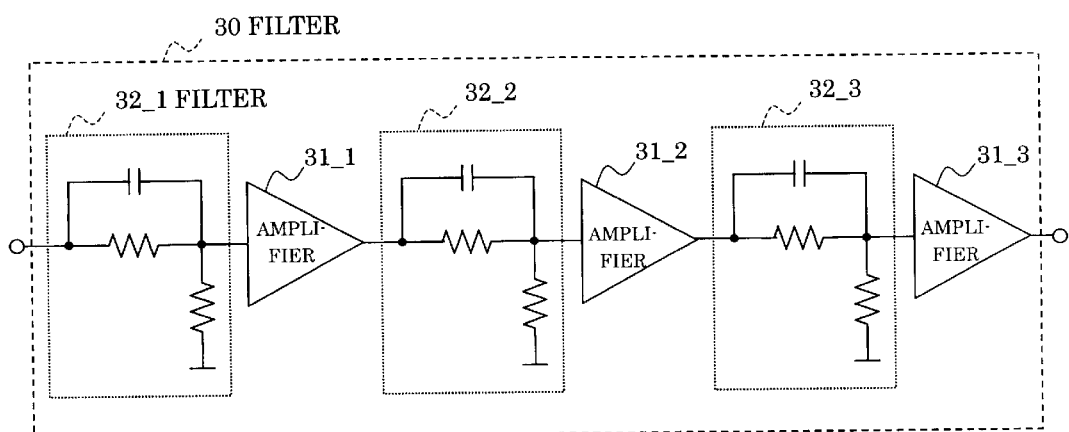
FIG. 4 is a circuit diagram showing a filter example of an optical modulator according to the present invention.

There are two following configurations by which the filter 30 is composed of the basic filters; (1) one for connecting the basic filters through amplifiers in the same way as FIG. 4, and (2) the other for transforming the basic filters into fixed resistance filters to be directly connected in cascade.

Hereinafter, an embodiment in which the basic filters are composed of the fixed resistance filters will be described.

FIGS. 8A–8C show arrangements of the basic filters, which respectively show the fixed resistance filter type 1–type 3 presenting the frequency characteristic of FIG. 7C. Thus, various types can be made for the basic filter of the fixed resistance type.

Figure 9:
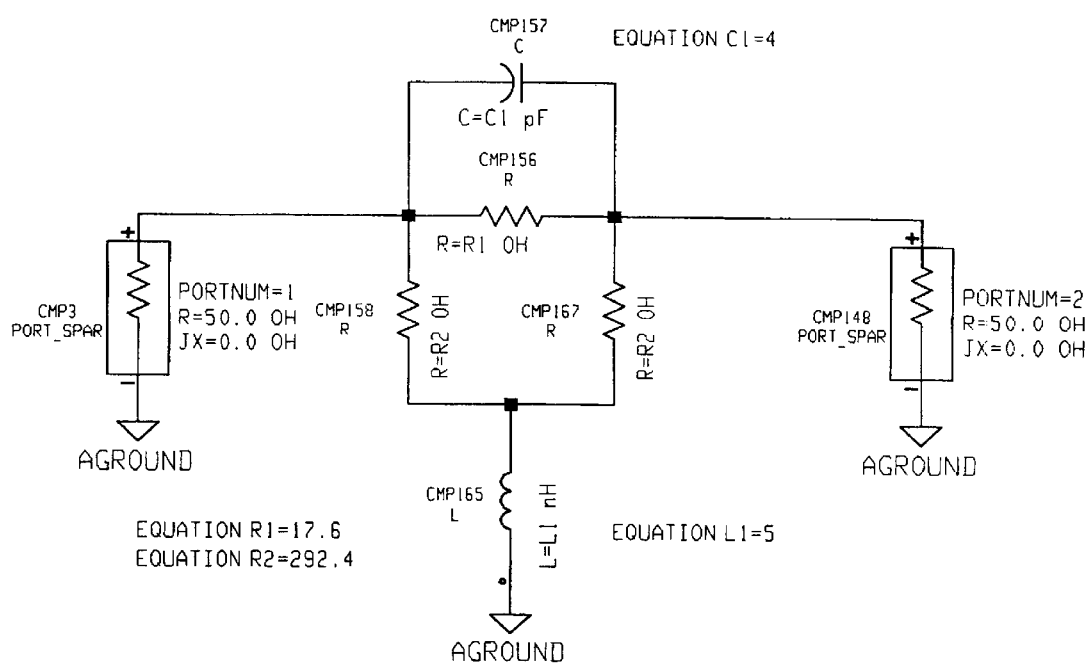
FIG. 9 is a circuit diagram representing a fixed resistance filter composing a filter by concentrated constants in an optical modulator according to the present invention.
Figure 10:
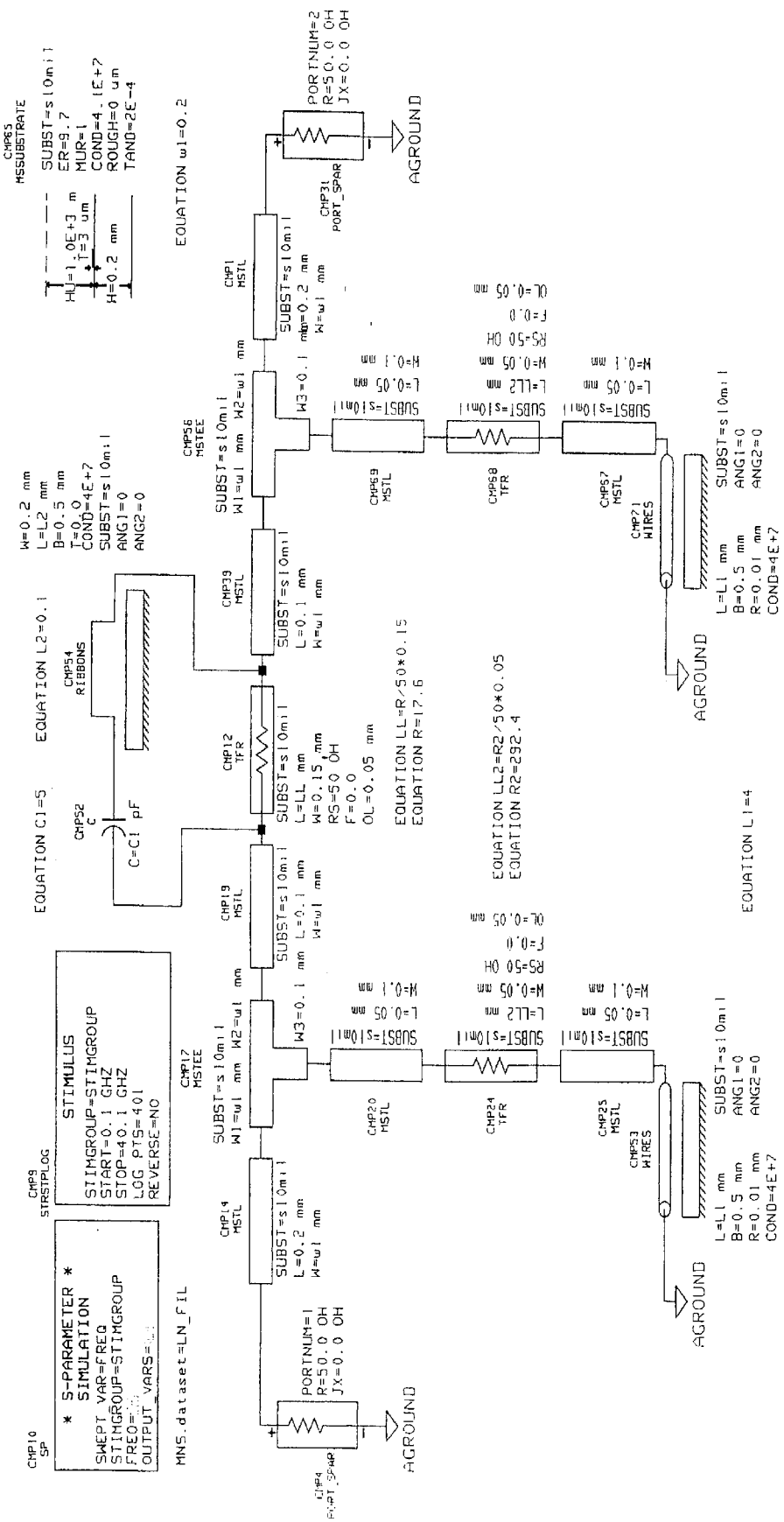
FIG. 10 is a circuit diagram representing a fixed resistance filter composing a filter by distributed constants in an optical modulator according to the present invention.

FIGS. 9 and 10 respectively show a circuit diagram of a concentrated constant and a distributed constant of the fixed resistance filter (type 3) shown in FIG. 8C.

Figure 11:
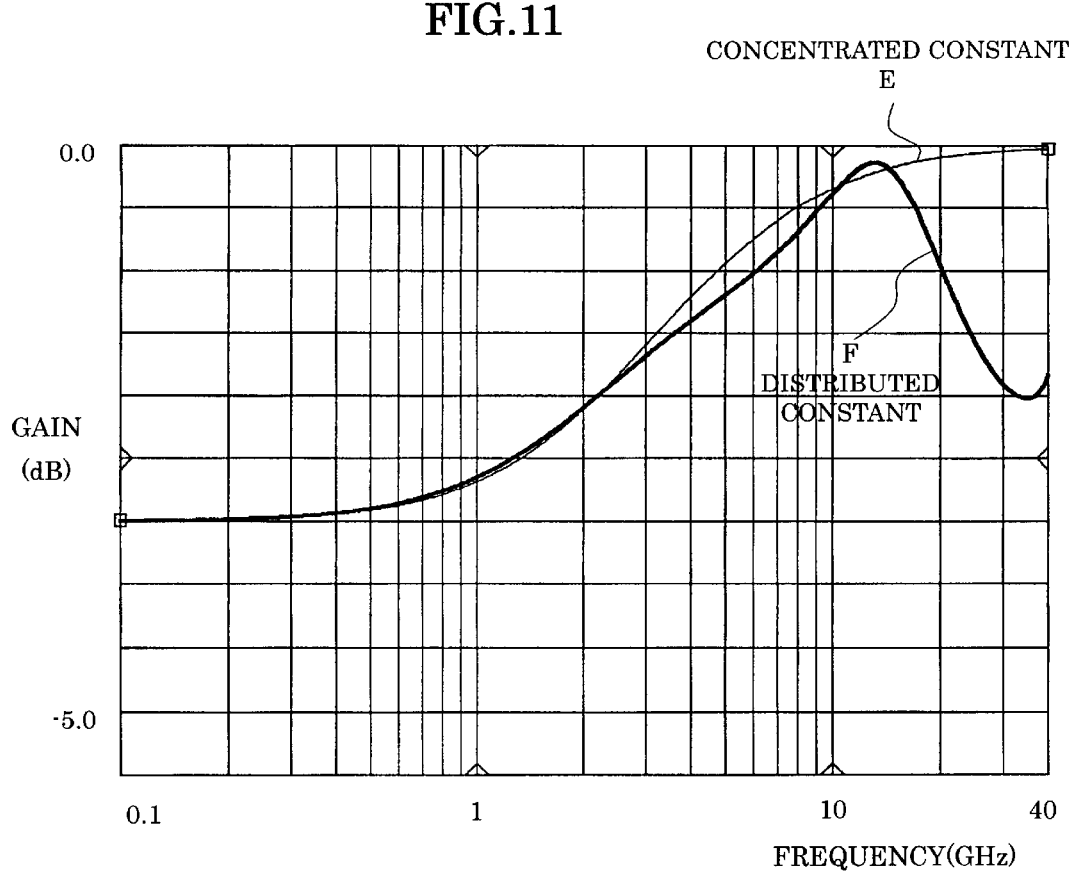
FIG. 11 is a diagram showing frequency characteristics of a fixed resistance filter in an optical modulator according to the present invention.
Figure 12:
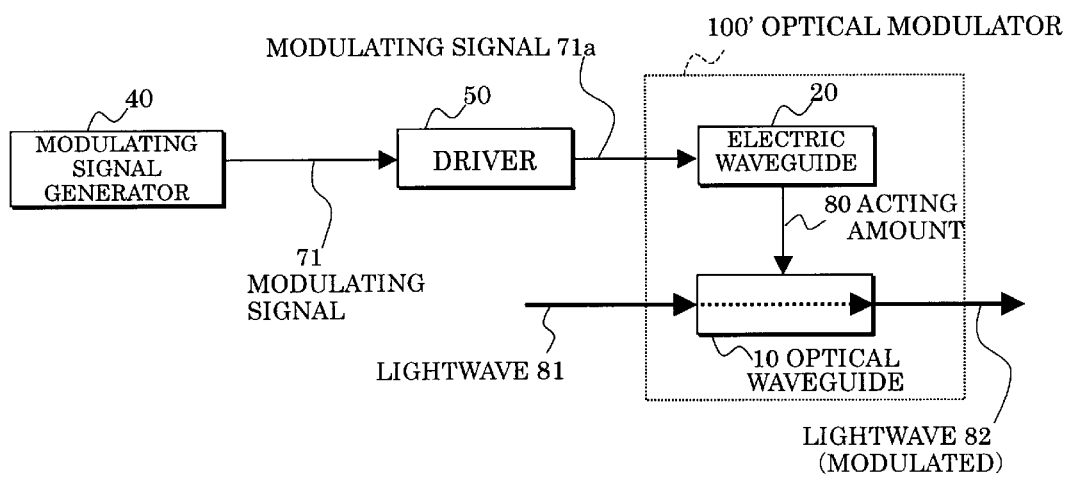
FIG. 12 is a block diagram showing an arrangement of a prior art optical modulator.

FIG. 11 shows a frequency characteristic of the parameter $S_{21}$ of the fixed resistance filter (type 3). Curves E and F respectively show a frequency characteristic with the concentrated constant of FIG. 9 and the distributed constant of FIG. 10. The characteristic of the fixed resistance filter (type 3) analyzed by the distributed constant is approximated to that of the concentrated constant at frequencies equal to or less than 14 GHz.

Accordingly, the basic filters whose frequencies ($f_1$, $f_2$) shown in FIG. 7C are respectively (0.1 GHz, 0.105 GHz), (0.8 GHz, 0.88 GHz), and (4.5 GHz, 5.76 GHz) are composed of the fixed resistance filter (type 3) shown in FIG. 8C. By directly connecting these three fixed resistance filters, the equalizing filter 30 having a characteristic D of FIG. 7A can be composed.

As described above, an optical modulator according to the present invention is arranged such that a filter converts a modulating signal into a signal approximating a frequency characteristic of an acting amount to be provided to an electric waveguide. Therefore, it becomes possible to suppress an attenuation of an acting amount inputted to an optical waveguide in a high frequency band, thereby reducing a deterioration of an optical waveform by an intersymbol interference.

Also, the filter approximates the frequency characteristic of the acting amount caused by a skin effect in the electric waveguide, thereby enabling an acting interval between the electric waveguide and the optical waveguide to be elongated. Thus, a voltage driving the electric waveguide 20 of a modulator such as a traveling wave type optical phase modulator can be lowered, so that a driver 50 of the electric waveguide 20 can be easily designed.

Furthermore, by composing a Mach-Zehnder type optical modulator with the optical modulator of the present invention, the Mach-Zehnder type optical modulator can suppress an attenuation in a high frequency band.

What we claim is:

1. An optical modulator comprising:

an optical waveguide to propagate a lightwave;

an electric waveguide to provide an acting amount, to the optical waveguide, to modulate the lightwave by a modulating signal; and a filter to convert the modulating signal into a signal approximating a frequency characteristic of the acting amount to be provided to the electric waveguide, wherein the filter is placed between a source of the modulating signal and the electric waveguide in compensation for an attenuation of the modulating signal in the high frequency area caused by the acting current.

2. The optical modulator as claimed in claim 1, wherein the frequency characteristic of the acting amount comprises a characteristic caused by a skin effect in the electric waveguide.

3. The optical modulator as claimed in claim 1, wherein the electric waveguide performs an optical phase modulation of the lightwave by an electro-optical effect.

4. The optical modulator as claimed in claim 3, wherein an interval length in which the electro-optical effect between the electric waveguide and the optical waveguide acts, and a voltage value provided to the electric waveguide are mutually determined.

5. The optical modulator as claimed in claim 1, wherein the filter comprises a plurality of fixed resistance filters connected in a multistage cascade.

6. The optical modulator as claimed in claim 1, wherein the filter comprises filters connected in a multistage cascade through an amplifier.

7. The optical modulator as claimed in claim 1, wherein one or two optical modulators comprises a Mach-Zehnder type optical modulator.

8. An optical modulator comprising:

an optical waveguide to propagate a lightwave;

an electric waveguide to provide an acting amount, to the optical waveguide, to modulate the lightwave by a modulating signal; and a filter to improve in a high frequency area of a frequency characteristic the acting amount to be provided to the electric waveguide, wherein the filter is placed between a source of the modulating signal and the electric waveguide in compensation for an attenuation of the modulating signal in the high frequency area caused by the acting amount.

9. The optical modulator as claimed in claim 8, wherein the filter comprises a plurality of fixed resistance filters connected in a multistage cascade.

10. The optical modulator as claimed in claim 8, wherein the filter comprises filters connected in a multistage cascade through an amplifier.

* * * * *

UNITED STATES PATENT AND TRADEMARK OFFICE
CERTIFICATE OF CORRECTION

PATENT NO. : 6,674,927 B2
DATED : January 6, 2004
INVENTOR(S) : Sadao Ibukuro

It is certified that error appears in the above-identified patent and that said Letters Patent is hereby corrected as shown below:

Column 8,
Line 22, change "claim 1" to -- claim 2 --.

Signed and Sealed this

Fourth Day of May, 2004

JON W. DUDAS
*Acting Director of the United States Patent and Trademark Office*